United States Patent Office 3,489,785
Patented Jan. 13, 1970

3,489,785
PENTACHLOROBENZAL CYANHYDRINE
Hitoshi Kurono, Nishinomiya-shi, and Kikuzo Murata, Takeshi Kosakada, and Toshihiko Hara, Kawachinagano-shi, Japan, assignors to Nihon Nohyaku Co., Ltd., Tokyo, Japan, a corporation of Japan
No Drawing. Filed Sept. 7, 1966, Ser. No. 577,586
Claims priority, application Japan, Sept. 14, 1965, 40/55,874; Sept. 15, 1965, 40/56,123; Apr. 28, 1966, 41/26,580
Int. Cl. C07c *121/74;* A01n *9/20*
U.S. Cl. 260—465
1 Claim

ABSTRACT OF THE DISCLOSURE

Pentachlorobenzal cyanhydrine having the following formula,

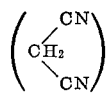

which has fungicidal property and is particularly useful for controlling various diseases of rice, fruits and vegetable plants.

---

The present invention relates to a novel fungicidal pentachlorobenzaldehyde derivative of the formula:

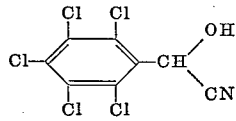

wherein R is a member selected from the group consisting of

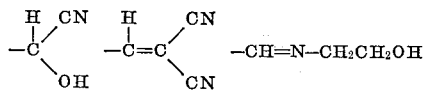

and

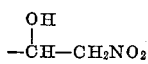

and more particularly the invention concerns a novel fungicidal composition containing the above said compound as a principal ingredient. In controlling rice blast, which is one of the most serious diseases in rice plant cultivation, various organic mercuric compounds, e.g. phenylmercury acetate (PMA), phenylmercury iodide (PMI), and N-tolylmercuri-p-toluene-sulfonanilide, have been proposed and practically used. However, employment of such a compound has been greatly limited, because of its considerable higher residual toxicity, and therefore nonmercury fungicidal compound has been long desired in an agricultural chemical field.

It has also been known that pentachlorobenzyl alcohol, which is rather similar to the present compounds, is effective for the control of rice blast. However, its fungicidal spectrum is extremely narrow so that the curative value of the compound against rice plant diseases is almost negligible in a practical use.

The compounds of the present invention are found to be of great value for the control of various diseases in rice plant, fruits and vegetable plants as well as rice blast.

These compounds are easily and advantageously synthesized by reacting pentachlorobenzaldehyde with hydrogen cyanide (HCN), nitromethane (CH$_3$NO$_2$), malononitrile

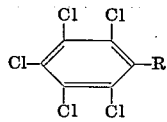

β-hydroxyethylamine (H$_2$N—CH$_2$CH$_2$OH) or the like.

For example, pentachlorobenzalcyanhydrine can be prepared by a series of steps of dissolving pentachlorobenzaldehyde in an organic solvent under heating, adding an equimolar alkalicyanide aqueous solution and then about two times equivalent of NaHSO$_3$ aqueous solution, or adding alkalicyanide and NH$_4$Cl aqueous solutions simultaneously to the organic solvent solution, to react hydrogen cyanide generated to the pentachlorobenzaldehyde thereby precipitating pentachlorobenzalcyanhydrine. Alternately, employing the conventional cyanhydrination, pentachlorobenzaldehyde is first reacted with NaHSO$_3$ in aqueous solution and the adduct product is then reacted with an aqueous alkalicyanide solution to obtain the end product.

The syntheses of the pentachlorobenzal compounds of the present invention are illustrated in the following four examples, A, B, C, and D.

EXAMPLE A 90 grams (0.36 mol) of pentachlorobenzaldehyde are suspended under stirring in 250 grams of butylcellosolve, 194 grams (0.62 mol) of 33% NaHSO$_3$ aqueous solution are added drop by drop, under vigorous stirring, to the suspension at 60° C., and the mixture is further maintained at the same temperature under stirring for 4 hours. After cooling the mixture to a room temperature, NaHSO$_3$ adduct product is separated by filtration therefrom: 145 grams of the said adduct are suspended into about one liter of water, the suspension is added with 88.5 grams (0.40 mol) of 22% NaCN aqueous solution at room temperature over 10 minutes and the mixture is further stirred for one hour. The reaction solution is neutralized with HCl, and the precipitated crystals are filtered, washed, dried and recrystallized from benzene-methanol mixed solvent to give 75.5 grams of white crystals. This product bubbles at 160° C. and melts completely at 188°–191° C.

Elementary analysis data of the product are shown below:

Analysis (as C$_8$H$_2$ONCl$_5$).—Calculated: C, 31.46%; H, 0.66%; N, 4.59%. Found: C, 31.93%; H, 0.66%; N, 4.52%.

EXAMPLE B

Pentachlorobenzalmalononitrile is obtained by the following method.

30 grams (0.12 mol) of pentachlorobenzaldehyde and 8.3 grams (0.12 mol) of malonitrile are suspended in 100 ml. of ethanol and a few drops of piperidine are added as a reaction activator thereto. The mixture is heated at 50°–70° C. for two hours and then cooled.

Upon filtering and drying the precipitate, 31 grams of the product are obtained. Melting point of the pure material (recrystallized from alcohol) is 139°–140° C. and elementary analysis data are shown below.

Analysis (as C$_{10}$HN$_2$Cl$_5$).—Calculated: C, 36.80%; H, 0.31%; N, 8.58%. Found: C, 36.50%; H, 0.27%; N, 8.62%.

EXAMPLE C

According to the method for making Schiff-base, pentachlorobenzal-β-hydroxyethylimine is prepared as follows:

30 grams (0.12 mol) of pentachlorobenzaldehyde are dissolved in 120 ml. of benzene, added with 5.9 grams (0.12 mole) of β-hydroxyethylamine and the mixture is refluxed for about 30 minutes.

During the course of said reflux, the reaction mixture is gelated. After heating at 50°–70° C. for further 2 hours, the reaction mixture is cooled to room temperature and the precipitated crystals are separated and dried. Thus, 32 grams of product are obtained.

Melting point of the purified material (recrystallized from benzene) is 125°–126° C., whose analysis data are shown below.

Analysis (as $C_9H_6ONCl_5$).—Calculated: C, 33.63%; H, 1.88%; N, 4.36%. Found: C, 33.32%; H, 1.92%; N, 4.34%.

EXAMPLE D

Pentachlorophenyl ω-nitroethanol is prepared as follows.

30 grams (0.12 mol) of pentachlorobenzaldehyde are dissolved in 500 ml. of ethanol and 6.9 grams (0.12 mol) of nitromethane are added drop by drop while cooling the ethanol solution. Thereafter, 30 ml. of aqueous methanol containing 8.4 grams of KOH are added thereto and pentachlorophenyl ω-nitroethanol acid type potassium salt (M.P. 158° C.) is obtained. 20 grams of this potassium salt are suspended in 200 ml. of water, and 200 ml. of N—$H_2SO_4$ are dropwise added at 20° C. while stirring thereto to decompose the salt. After standing for overnight, the precipitated crystals are filtered and dried. Melting point: 100°–103° C.

Analysis (as $C_8H_4O_3NCl_5$) Calculated: C, 28.31%; H, 1.19%; N, 4.13%. Found: C, 28.32%; H, 1.23%; N, 4.10%.

The present compounds are readily soluble in alcohol, acetone, dimethylformamide and the like, but hardly soluble in such solvent as benzene, carbontetrachloride and ether.

In using the present compounds as a fungicide, it is preferable to employ them with an inert carrier though the latter may be omitted if desired.

The term "inert carrier" as used herein refers to the carrier which may transfer the present compound (toxicant) to the objective pests. Typical carrier may include solid carrier such as diatomaceous earth, talc, clay and bentonite, and liquid carrier such as alcohol, xylene, cyclohexane and dimethylformamide. In assuring a further increased effect of the present compound, the present fungicidal composition may, of course, comprise dispersing and wetting agents such as, for example, alkylaryl sulfonate, aliphatic alcohol sulfate, and the condensate of alkyl phenol with ethyleneoxide. The present compounds are compatible with various insecticides such as BHC (γ-hexachlorocyclohexane), EPN (O-ethyl-O-p-nitrophenyl benzene phosphonothionate), and PAP (O,O-dimethyl-S-carbethoxy benzyl phosphorodithioate), and various antibiotics such as blasticidin-S, Kasugamycin and cellocidin. Fungicidal activities of the present compounds are described hereinunder.

TEST EXAMPLE 1

Fungicidal activities against various plant diseases

*Test method.*—Employing a series of diluted culture media, potato-extract agar media, added with toxicant, the following germs were cultured for 6 days and minimal inhibitory concentrations were determined in p.p.m. In inoculating the germs, filamentous fungus spores and bacteria were used as an aqueous suspension respectively, and mycelia were directly put in the culture media by using platinum wire.

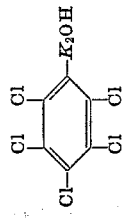

As shown in the aforesaid table, all of the pentachlorobenzal derivatives of the present invention have excellent germicidal activities against pathogenic organisms of rice plant, vegetables and fruit trees.

TEST EXAMPLE 2

A rice nursery of 0.4 m.$^2$ in area and 12 cm. in the ridge distance (kind of rice plant: Kinnanpuh) was employed as one section for the test. Rice blast infected leaves were placed between the ridges and spontaneous infection was induced thereby. Thereafter, a test solution was sprayed over the rice nursery and infected plants were checked in three different times.

In each time, 30 rice plants were taken up at random, each plant was classified in either of 10 consecutive indexes beginning from 0 for no infection to 9 for complete death, and an average value of these infection indexes was determined.

Infected leaves, placed on Aug. 10, 1965,
Toxicant, sprayed on 8/30, 9/3, 9/6,
Tested on 9/10, 9/15, 9/18.

Tested results were shown in Table 2.

TEST EXAMPLE 3

Cucumber plant (kind: Yotsuba) and tomato plant (kind: Ponterosa) were planted in each unglazed pottery (12 cm. of inner diameter) placed in a green house.

Test solutions were sprayed on the potteries by using Turn-table Spray-gun (Pressure 1.5 kg./cm.$^2$).

In each case, the spraying amounts of the test solution was adjusted at 15 cc. per pottery for the comparison's sake. After one day from the said spraying, pathogenic germs, i.e. cucumber anthracnose, cucumber scab or tomato leaf mold, were sprayed on and back of the tested leaves by using atomizer. Thus treated potteries were placed in a green house maintained at 25° C. for 24 hours and thereafter left for a defined period of time and were checked for infected leaves.

Infection degree of each leaf was classified in either of 6 consecutive steps beginning from 0 and ending at 5, and an average infected index per leaf was calculated. These results were shown in Table 3.

TABLE 2.—EFFECT ON RICE BLAST

| Tested Compound | Concentration (p.p.m.) | Infection Index 1st Test | 2nd Test | 3rd Test | Injury to plant |
|---|---|---|---|---|---|
| 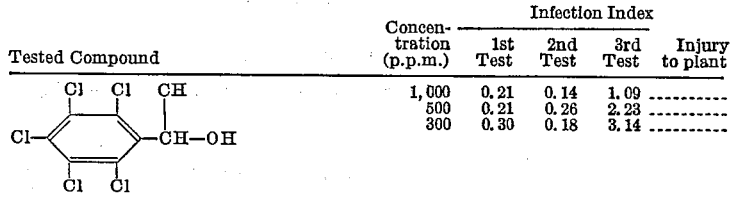 | 1,000<br>500<br>300 | 0.21<br>0.21<br>0.30 | 0.14<br>0.26<br>0.18 | 1.09<br>2.23<br>3.14 | |
| 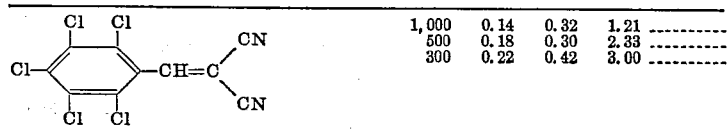 | 1,000<br>500<br>300 | 0.14<br>0.18<br>0.22 | 0.32<br>0.30<br>0.42 | 1.21<br>2.33<br>3.00 | |
| 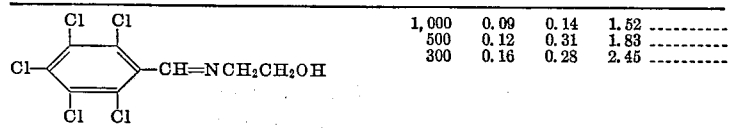 | 1,000<br>500<br>300 | 0.09<br>0.12<br>0.16 | 0.14<br>0.31<br>0.28 | 1.52<br>1.83<br>2.45 | |
| 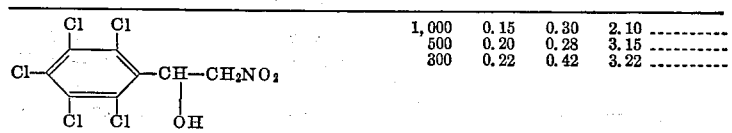 | 1,000<br>500<br>300 | 0.15<br>0.20<br>0.22 | 0.30<br>0.28<br>0.42 | 2.10<br>3.15<br>3.22 | |
| 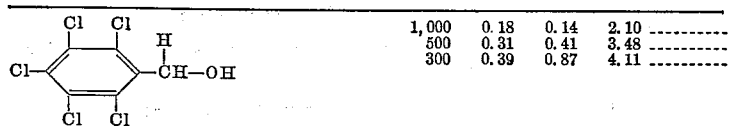 | 1,000<br>500<br>300 | 0.18<br>0.31<br>0.39 | 0.14<br>0.41<br>0.87 | 2.10<br>3.48<br>4.11 | |
| PMI (phenylmercuri-iodide) (as Hg) | 20 | 0.64 | 1.31 | 5.57 | |
| No treatment | | 3.96 | 5.09 | 8.00 | |

TABLE 3

| Tested Compounds | Concentration (p.p.m.) | Cucumber "Anthracnose" infected index per leaf | Cucumber "Scab" infected index per leaf | Tomato "leaf mold" infected index per leaf |
|---|---|---|---|---|
| 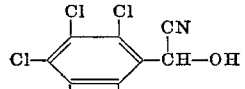 | 1,000<br>500 | 0.50<br>1.00 | 1.83<br>2.17 | 3.55<br>3.21 |
| 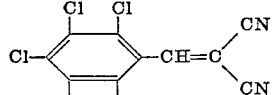 | 1,000<br>500 | 0.44<br>1.00 | 0.50<br>2.10 | 2.05<br>2.44 |
| 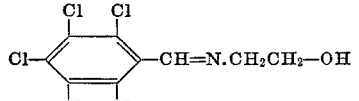 | 1,000<br>500 | 1.00<br>1.34 | 2.17<br>2.72 | 3.21<br>3.55 |
| 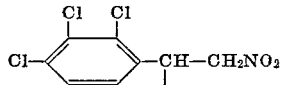 | 1,000<br>500 | 0.06<br>1.05 | 3.20<br>3.44 | 2.40<br>3.46 |
| 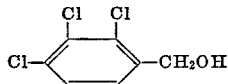 | 1,000<br>500 | 1.00<br>1.28 | 2.72<br>2.43 | 3.29<br>3.46 |
| 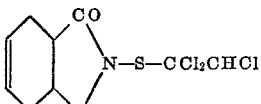<br>(Difolatan) | 800<br>400 | 0.07<br>1.05 | 0.44<br>0.61 | 0.96<br>1.34 |
| No spraying | | 4.33 | 3.67 | 3.63 |

Most preferable form of the present fungicidal composition is the dust containing 2–6% of the present compound. However, wettable powder and emulsifiable concentrate may also satisfactorily be employed.

As for the employing amount, it may widely be varied with the employing time, object, infection degree and the like. It is, however, generally preferable to employ 10–200 grams of the present compound per 10 ares.

The following examples are given only to aid for understanding the invention and it is to be understood that this invention is not restricted to the particular proportions or procedures set forth therein:

Example 1: Percent w./w.
Pentachlorobenzalcyanhydrine _____ 4
A mixture of talc and clay _____ 96

The above were mixed and pulverized to give a dust.

Example 2: Percent w./w.
Pentachlorobenzalcyanhydrine _____ 2
Blastocizin-S _____ 0.10
A mixture of talc and clay _____ 97.90

These were mixed and pulverized to give a dust.

Example 3: Percent w./w.
Pentachlorophenyl ω-nitroethanol _____ 50
A mixture of diatomaceous earth and clay ___ 45
Condensation product of alkyl phenol with ethyleneoxide _____ 2
Sodium lignine sulfonate _____ 3

These were mixed and pulverized to give a water miscible concentrate.

Example 4: Percent w./w.
Pentachlorobenzalmalononitrile _____ 30
A mixture of diatomaceous earth and clay ___ 65

Example 4—Continued: Percent w./w.
Condensation product of alkyl phenol with ethyleneoxide _____ 2
Sodium lignine sulfonate _____ 3

These were combined and pulverized to give a wettable powder.

Example 5: Percent w./w.
Pentachlorobenzal β-hydroxyethylimine _____ 10
Xylene _____ 50
Dimethylformamide _____ 30
Condensation product of alkyl phenol with ethyleneoxide _____ 10

These were combined and dissolved each other to give an emulsifiable concentrate.

What we claim is:
1. Pentachlorobenzal cyanhydrine.

References Cited

UNITED STATES PATENTS 2,631,168  3/1953  Ross et al. _____ 260—465 X
3,013,050  12/1961  Richter _____ 260—465 X
3,013,059  12/1961  Richter _____ 260—465 X
3,250,798  5/1966  Shulgin _____ 260—465

OTHER REFERENCES

Schwartz et al., French Patents Abstracts, vol. 6, No. 46, p. 5:2, 1966.

CHARLES B. PARKER, Primary Examiner
S. T. LAWRENCE III, Assistant Examiner

U.S. Cl. X.R.

260—566, 618; 424—304, 325, 343